United States Patent
Kaule et al.

(10) Patent No.: US 6,479,133 B1
(45) Date of Patent: *Nov. 12, 2002

(54) DOCUMENT HAVING A VALUE

(75) Inventors: Wittich Kaule, Emmering (DE); Gerhard Stenzel, Germering (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/381,639

(22) PCT Filed: Jan. 29, 1999

(86) PCT No.: PCT/EP99/00592

§ 371 (c)(1),
(2), (4) Date: Jan. 7, 2000

(87) PCT Pub. No.: WO99/39051

PCT Pub. Date: Aug. 5, 1999

(30) Foreign Application Priority Data

Feb. 2, 1998 (DE) .......................... 198 04 024

(51) Int. Cl.⁷ ................................................. B32B 3/00
(52) U.S. Cl. ........................... 428/195; 428/67; 283/57; 283/74; 283/901; 283/904
(58) Field of Search ................ 428/67, 80, 199, 428/204, 207, 211, 333, 403, 464, 690, 913, 916; 283/57, 74, 113, 114, 107, 901, 904; 427/7

(56) References Cited

U.S. PATENT DOCUMENTS

| | | | | |
|---|---|---|---|---|
| 4,183,989 A | * | 1/1980 | Tooth | 428/195 |
| 4,451,521 A | | 5/1984 | Kaule et al. | |
| 4,452,843 A | | 6/1984 | Kaule et al. | |
| 4,533,244 A | * | 8/1985 | Kaule et al. | 356/71 |
| 5,005,873 A | * | 4/1991 | West | 283/92 |
| 5,599,578 A | | 2/1997 | Butland | |

FOREIGN PATENT DOCUMENTS

| | | | |
|---|---|---|---|
| GB | 1514758 | | 6/1978 |
| GB | 2258659 A | | 2/1993 |
| GB | 2258660 A | * | 2/1993 |

* cited by examiner

Primary Examiner—Cathy Lam
Assistant Examiner—G. Blackwell-Rudasil
(74) Attorney, Agent, or Firm—Bacon & Thomas

(57) ABSTRACT

The invention concerns a printed valuable document with at least one authentication feature in the form of a luminescent substance based on a host lattice doped with at least two rare earth metals. The host lattice largely absorbs in the visible region of the spectrum, is excitable in large parts of the visible region of the spectrum and transparent at least in partial areas of the IR spectral region. The luminescent substance is present in the volume of the valuable document in such a concentration that the characteristics of the valuable document just remain unimpaired. The rare earth metals concerned are thulium and holmium.

26 Claims, 2 Drawing Sheets

DOCUMENT HAVING A VALUE

The invention concerns a printed valuable document with at least one authentication feature in the form of a luminescent substance based on a host lattice doped with at least one rare earth metal.

The protection of valuable documents by means of luminescent substances has long been known. The use of rare earth elements in this connection has also been discussed. These have the advantage of possessing narrow band emission lines that are particularly characteristic and can therefore be safely distinguished from the emissions of other substances when using measuring technology. Preferably substances are used that have emission lines in the invisible region of the spectrum, especially in the infrared (IR) spectral region.

In order to enhance protection against counterfeiting, the rare earth metals can be incorporated with other substances into host lattices in such a manner that the excitation or emission spectrum of the rare earth metal is influenced in a characteristic manner. Through combination with suitably absorptive substances, for example, a part of the excitation and/or emission bands of the rare earth metal can be suppressed. This influence, however, may also take the form of a "distortion", for instance through damping of particular areas of the excitation or emission spectra.

Starting from this state of the art, the invention is based on the aim of producing a valuable document with an authentication feature in the form of luminescent substances that, compared with the state of the art, are more difficult to detect and therefore offer greater security against counterfeiting.

The fulfilment of this aim is embodied in the non-dependent claims. Further developments of these are the subject of the dependent claims.

As already stated, for the purposes of checking the authenticity of valuable documents, the emission lines of rare earth metals lying in the IR spectral region are used. Preferably, emission lines are used that lie in the near IR, since these can still be detected with low cost sensors and, because of the favourable signal-to-noise ratio, erroneous measurements can be avoided relatively easily. Normally, commercially available silicon (Si) or germanium (Ge) detectors are used for this. The further into the IR spectral region the emission lines lie, the more difficult it is to detect the emissions. The reason for this is that, in general, the detection sensitivity or response sensitivity of photodetectors decreases the longer the wavelength of the radiation to be measured. This means that the signal-to-noise ratio of the detected signals generally becomes smaller with increasing wavelength. As a result, the measuring technology needed to evaluate the signals and the necessary expertise becomes ever more expensive. If these luminescent substances that are technically difficult to detect are also only present in the valuable documents under test in small concentrations, detection of the emission lines is only possible under special conditions.

The invention is based on the recognition that this increasingly difficult detectability of certain substances with increasing emission wavelength in the IR region can be employed to great advantage to increase the level of counterfeit protection.

According to the invention, therefore, in order to protect valuable documents, a luminescent substance is used whose emission spectrum lies beyond the response sensitivity of Si or Ge detectors, or at least at the border of detectability for a Ge detector. In this case, the technical effort required for detection with a Ge detector must be multiplied many times or, for instance, lead sulphide (PbS), indium arsenide (InAs), gallium-indium arsenide (GaInAs) or lead selenide (PbSe) detectors used. However, these detectors' detection sensitivity is powers of ten lower than that of Si detectors, so that the technical evaluation of the signals from a detector of this kind is always significantly more difficult.

The substances suitable for the authenticity protection could be materials based on holmium-doped or thulium-doped host lattices. Thulium produces emission lines in the wavelength range from 1.6 to 2.1 $\mu$m, and especially in the range 1.7 to 1.9 $\mu$m, and holmium produces emission lines in the range from 1.8 to 2.1 $\mu$m. The emission spectra of the two rare earth doping-metals therefore overlap each other, so that with suitable stimulation of both doping substances, the emission intensity is increased in the overlap area. By this means, the emission signal stands out strongly from the background noise. The double doping also has the advantage that, on the basis of the emission spectrum, conclusions can be drawn concerning the optically active elements of the luminescence material. Furthermore, in comparison to the use of just one rare earth metal, there are more emission lines available for evaluation. In this way, it is more difficult for potential counterfeiters to find out which of the lines are actually evaluated during authenticity checking.

Thulium can just be detected with Ge detectors with correspondingly high levels of technical effort, since the response sensitivity of Ge detectors at a wavelength of 1.6 $\mu$m is already very small, while at 1.9 $\mu$m, it tends towards zero. Holmium, on the other hand, cannot be detected with Ge detectors. The emissions of both rare earth metals can, however, be detected with PbS, InAs or GaInAs detectors. Since the response sensitivity of these detectors is also very low in the wavelength range from 1.7 to about 2.1 $\mu$m, the thulium and the holmium must be incorporated into a host lattice that ensures the highest possible effectiveness of the doping substances—that is, one that provides for the highest possible quantum yield. According to the invention, host lattices are used that contain broad-band absorptive components and transfer the absorbed energy highly efficiently to the rare earth doping metals. Preferably, the quantum yield of the luminescent substances according to the invention lies in the range between 50 and 90%.

In addition, the invention provides for use of the luminescent substance in the relevant valuable document at such a concentration that just avoids impairing the characteristics of the valuable document. The maximum concentration depends on various parameters, such as, for instance, the manner of application or the desired characteristics (colour or similar) of the valuable document.

If, for instance, the luminescent substance is embedded in a paper pulp, then the maximum allowable concentration of foreign substances is just a few percent by weight. If the allowable foreign substance concentration is exceeded, this results in marked changes to the material properties. For instance, too high a foreign substance concentration in the paper reduces the tear resistance of the paper. If the luminescent substance has its own colour, then a concentration of only about 0.1 percent by weight may suffice to change the colour of the entire paper. An excessively high foreign substance concentration in printing inks makes the inks brittle and reduces their adhesion on the document surface. In this case, also, a concentration of just 1 percent by weight of a coloured luminescent substance my suffice to distort the entire colour appearance of the printing ink. If, on the other hand, this luminescent substance serves simultaneously as a colour pigment, the limit concentration may only be reached at the physical maximum of possible solid substance content of about 80 percent by weight.

According to the invention, the lower limit concentration in the case of colourless or slightly coloured luminescent substances for mixing into the paper pulp is around 0.1 percent by weight. In the case of more strongly coloured luminescent substances, the limit concentration may lie at just 0.01 percent by weight. Preferably, the concentration is in the range from 0.05 to 1 percent by weight. The lower concentration limit of the luminescent substance in a layer applied to the valuable document, however, is about 1 percent by weight, for example in the case of coloured luminescent substances. Depending on the layer composition and application purpose, the concentration is in the range from 1 to 40 percent by weight, and preferably in the range from 10 to 30 percent by weight.

The incorporation of luminescent substances at a concentration that is just admissible i.e. one that does not impair the paper's named characteristics—prevents counterfeiting attempts where, in ignorance of the real luminescent substances, less effective replacement materials with similar emission lines are used, but which must be added to the valuable document in higher concentrations in order to produce measurable signals. This leads to recognisable changes in the valuable document or to the printing ink containing the luminescent substance. In the case of coloured substances, for instance, this would lead to a discoloration of the valuable document or the printing ink.

According to the invention, the luminescent substances can be applied to the valuable document in a variety of ways. For example, luminescent substances can, as already mentioned, be added to a printing ink, which also contains visually detectable pigments. The luminous materials can also be added to the paper pulp. The luminescent substances can also be provided on or in a plastic base material which, for instance, is at least partially embedded into the paper pulp. The base material may take the form of a safety thread, a mottling thread or a planchet.

However, the plastic or paper base material can be attached to any other required object, for example, for product security. In this case, the base material is preferably produced in the form of a label. If the base material is a component part of the product to be secured, as in the case of tear-off threads, naturally any other shape is also possible. In certain applications, it may be useful to provide the luminescent substance as an invisible coating on the valuable document. It could be present over the whole surface or in the form of particular patterns, such as stripes, lines, circles or alphanumeric signs. In order to ensure the invisibility of the luminescent substance according to the invention, either a colourless luminescent substance must be used at the maximum concentration for the printing ink or coating lacquer, which is just below the level where it impairs the characteristics of the coating, or a coloured luminescent substance must be used in such a low concentration that the coating just retains its transparency.

The designation "valuable document" within the scope of the invention denotes bank notes, cheques, shares, stamps, identification papers, credit cards, passes and other documents, as well as labels, seals, packaging or other elements for product security.

The luminescent substances according to the invention have emission spectra that lie so far into the IR spectral region that they can only be detected by the detectors available for this region with great technical effort if they are added to the valuable document to be marked in the maximum quantity which does not alter the document.

Luminescent substances of this kind are designated below as "limit luminescent substances".

From the safety standpoint, they have the advantage, compared with other luminescent substances that do not lie on these limits, that they are practically not employed in other technical areas and are therefore not available commercially. Furthermore, the detection technology is so complicated that the risk of analysis of the measurement parameters is relatively slight. But even if the existence of the luminescent substance was known to a forger, as already stated, he could only copy it by exactly setting all the parameters responsible for the luminescence. Luminescent substances with poorer properties either produce lasting changes to the characteristics of the valuable document, or they are no longer detectable in the detection devices.

BRIEF DESCRIPTION OF THE DRAWINGS

Other embodiments and advantages of the invention are set out below with the aid of illustrations and examples.

DETAILED DESCRIPTION OF THE INVENTION

Figure 1:
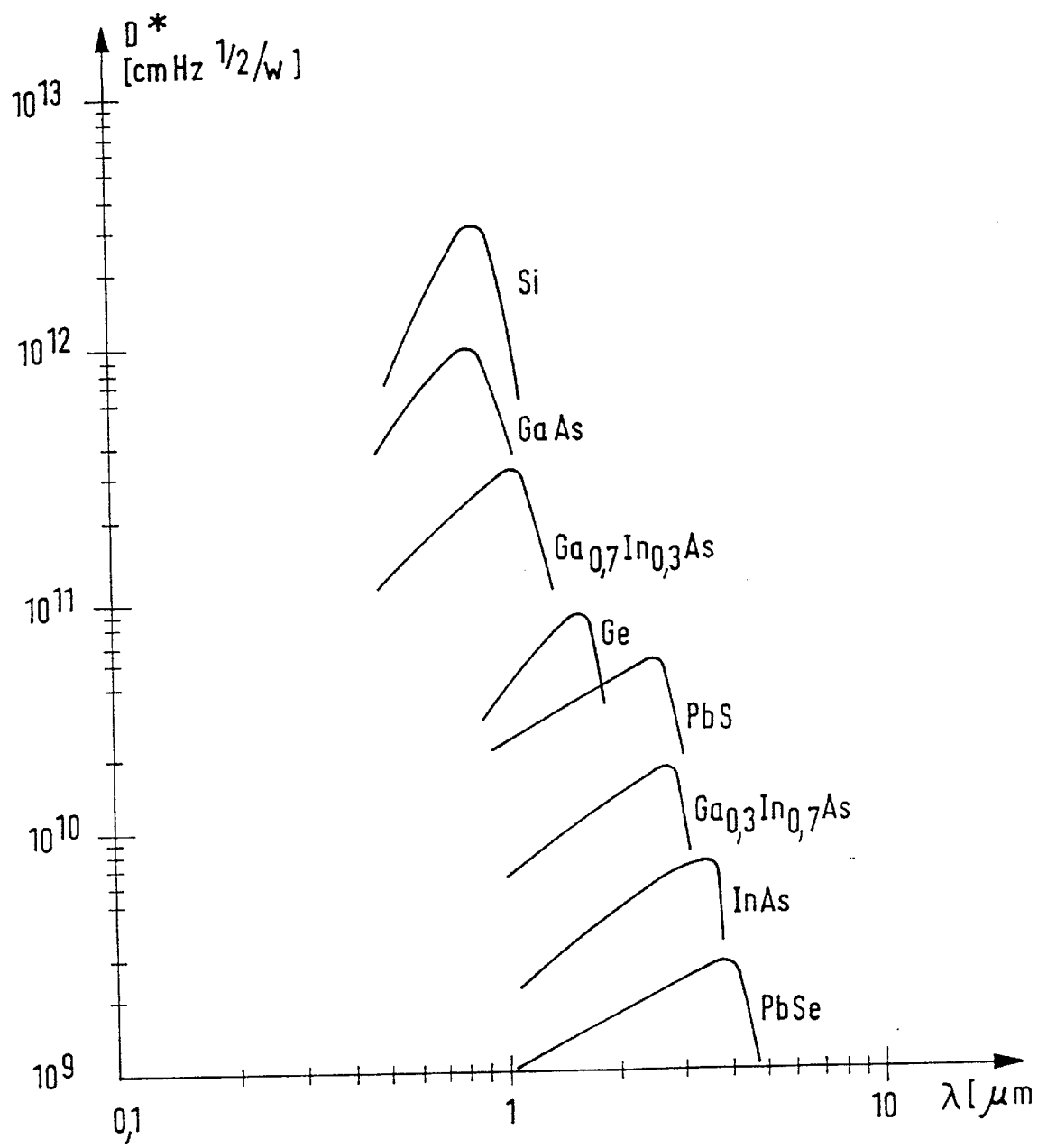
FIG. 1 Detection sensitivity of various detectors

FIG. 1 shows the detection sensitivity D* of various detectors against wavelength $\lambda$. This gives a measure of the response sensitivity of the detector. For reasons of clarity, the curves are only shown in the region of their sensitivity maximum. It can be seen from this figure that Si and GaAs detectors can no longer be used in the region above 1.1 $\mu$m. The sensitivity of gallium arsenide can be shifted further into the IR spectral region through addition of indium. Thus a $Ga_{0.7}In_{0.3}As$ detector can be used up to about 1.2 $\mu$m, while a $Ga_{0.3}In_{0.7}As$ detector can be used up to about 3 $\mu$m. However, in this region, the detection sensitivity decreases markedly. It can also be seen from this figure that Ge detectors can be used up to about 1.8 $\mu$m, and that in the region up to 3 $\mu$m, preferably PbS detectors or suitably adapted $Ga_xIn_{x-1}As$ detectors are used. The index x is selected so that the detection sensitivity maximum lies at the desired limit wavelength. In principle, InAs or PbSe detectors can also be used. Their detection sensitivity, however, is a power of ten below that of PbS detectors. Furthermore, the detection sensitivity maximum lies within the wavelength region of about 3 to 4 $\mu$m, so that these are not ideally suited to the detection of thulium and holmium.

Figure 2:
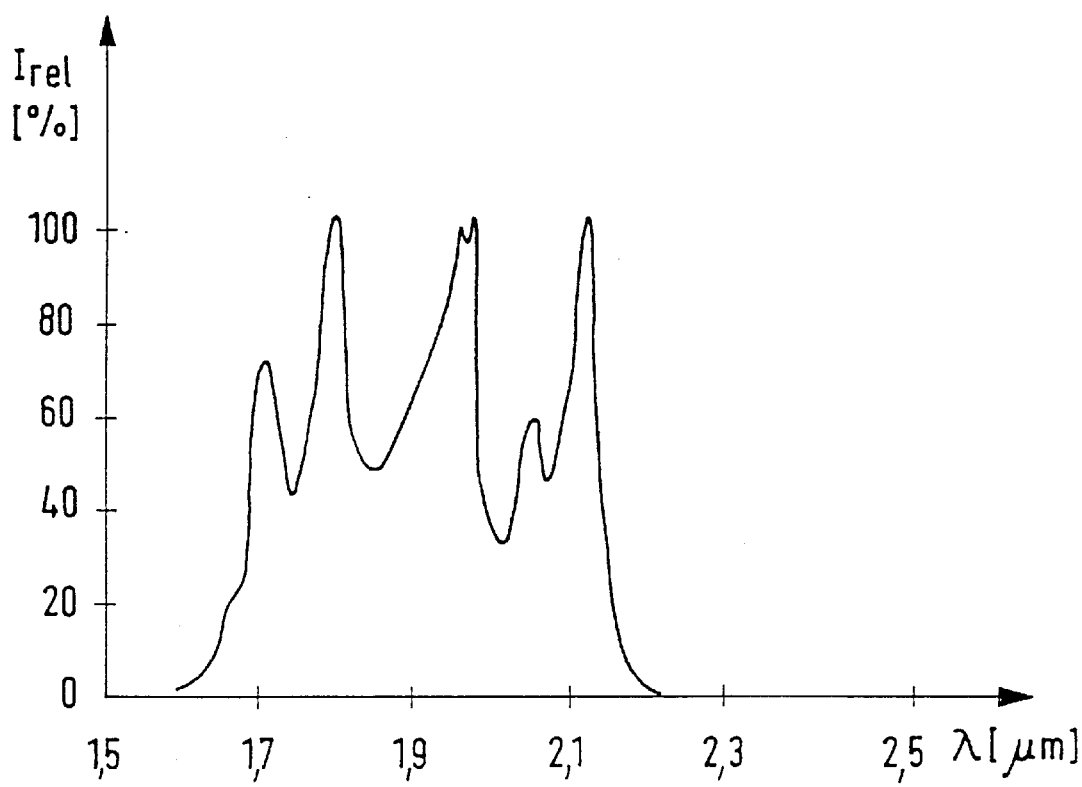
FIG. 2 Emission spectra of a limit luminescent substance according to the invention FIG. 3 Security element according to the invention in cross section

FIG. 2 shows the emission spectrum of a thulium and holmium-doped limit luminescent substance according to the invention. The emission lines of the thulium and the holmium occurring in the visible and possibly in the near IR are suppressed by the host lattice. As can be seen from FIG. 2, the limit luminescent substance emits radiation in the wavelength range between ca. 1.6 and 2.1 $\mu$m, and especially between 1.7 and 2.1 $\mu$m. Comparing this emission spectrum with the detection sensitivity curves of the sensors shown in FIG. 1, it can be seen that the emission spectrum of the limit luminescent substance according to the invention cannot be detected with detectors of high detection sensitivity, that is, with Si or GaAs detectors. With Ge detectors, whose detection sensitivity maximum is shifted further into the IR spectral region, parts of the emission spectrum shown in FIG. 2 can just be measured by applying a great deal of effort. But not before reaching PbS detectors is detection of the full spectrum possible. These detectors, however, are about two powers of ten less sensitive than silicon. This means that the signal-to-noise ratio is significantly worse than for Si detectors and that therefore a high level of technical effort is necessary in order to evaluate the luminescence signal of the limit luminescent substance. According to the invention, however, it is this very condition that is utilised in order to increase the anti-counterfeit security.

The host lattice for the optically active rare earth metals thulium and holmium according to the invention has an optically transparent region in the wavelength range between 1 μm and 10 μm. The host lattice according to the invention also contains iron or chromium as absorptive elements, which absorb in practically the entire visible region of the spectrum and therefore, in place of the individual excitation lines of holmium occurring in this region, have a broader excitation range, which is also better suited to broad-band luminous light sources.

The limit luminescent substances according to the invention preferably have a garnet or perovskite structure. In order to ensure the highest possible effectiveness of the holmium, in the case of a garnet structure, host lattices with the general formula $$A_3M_{5-x}Al_xO_{12}$$

are used, where A represents an element from the group scandium (Sc), yttrium (Y), lanthanum (La) and gadolinium (Gd), M stands for iron (Fe) or chromium (Cr) and the index x fulfils the condition 0<x<4.99, and preferably 0.5<x<2. According to a preferred embodiment, the lattice consists of an yttrium-aluminium-iron garnet.

The absorption and therefore the brightness of a possible intrinsic colour of the material can be adjusted through the proportion of non-absorbing aluminium, so that the luminescent substance can also be used in higher concentrations as an additive for lighter printing inks.

If a perovskite structure is used for the host lattice, this can be described with the general formula $$AMO_3$$

where A stands for an element in the group scandium (Sc), yttrium (Y) and the lanthanides (La), and M stands for iron (Fe) or chromium (Cr).

The preferred embodiment for a luminescent substance according to the invention in a perovskite structure is described by the formula $$Y_{1-z-y}Tm_zHo_yFeO_3$$

where the index z fulfils the condition 0.01<z<0.8, and preferably 0.1<z<0.5 and the index y fulfils the condition 0.01<y<0.8, and preferably 0.1<y<0.5.

The excitation region of this limit luminescent substance lies in the visible spectral region and possibly also in the near IR. This region is covered by the radiation range of strong light sources, such as halogen lamps, flash lamps or similar.

The limit luminescent substance in accordance with the invention is described in greater detail with the aid of a few examples below.

Example 1

Manufacture of thulium/holmium-activated gadolinium-aluminium-iron mixed garnet ($Gd_{2.7}Tm_{0.1}Ho_{0.2}Fe_{4.5}Al_{0.5}O_{12}$):

52.55 g gadolinium oxide ($Gd_2O_3$), 2.74 g aluminium oxide ($Al_2O_3$), 38.58 g iron oxide ($Fe_2O_3$), 2.07 g thulium oxide ($Tm_2O_3$), 4.06 g holmium oxide ($Ho_2O_3$) and 100 g desiccated sodium sulphate ($Na_2SO_4$) are mixed intimately and heated to 1100° C. in a corundum crucible for 12 hours.

Following cooling, the reaction product is ground, the fluxing agent washed out with water, the product is filtered and air dried at 100° C. In order to achieve the finest possible grain size, the powder is subsequently milled in water with a stirring ball mill until an average grain size of less than 1 μm is achieved.

After filtration and drying, a green powder results.

Example 2

Manufacture of thulium and holmium-activated yttrium-aluminium-chromium mixed garnet ($Y_{2.6}Tm_{0.2}Ho_{0.2}CrAl_4O_{12}$):

45.18 g yttrium oxide ($Y_2O_3$); 31.38 g aluminium oxide ($Al_2O_3$), 11.7 g chromium oxide ($Cr_2O_3$), 5.93 g thulium oxide ($Tm_2O_3$), 5.81 g holmium oxide ($Ho_2O_3$) and 100 g desiccated sodium sulphate ($Na_2SO_4$) are mixed intimately and heated to 1100° C. in a corundum crucible for 12 hours.

Following cooling, the reaction product is ground, the fluxing agent washed out with water, chromate formed as a side-product is reduced with sulphuric acid/iron (II) sulphate to chromium (III) sulphate, the product is filtered and air dried at 100° C. In order to achieve the finest possible grain size, the powder is subsequently milled accordingly in water with a stirring ball mill.

After filtration and drying, a light green powder with an average grain size of less than 1 μm results. Example 3

Manufacture of holmium/thulium-activated yttrium-iron perovskite ($Y_{0.67}Tm_{0.2}Ho_{0.13}CrFeO_3$): 34.6 g yttrium oxide ($Y_2O_3$); 36.52 g iron oxide ($Fe_2O_3$), 11.23 g holmium oxide ($Ho_2O_3$), 17.63 g thulium oxide ($Tm_2O_3$), and 100 g desiccated sodium sulphate ($Na_2SO_4$) are mixed intimately and heated to 1100° C. in a corundum crucible for 20 hours.

Following cooling, the reaction product is ground, the fluxing agent washed out with water, and the product is air dried at 100° C. In order to achieve the finest possible grain size, the powder is subsequently milled in water with a stirring ball mill.

After filtration and drying, a powder with an average grain size of less than 1 μm results.

According to the invention, the anti-counterfeiting security is further enhanced if the luminescent substance is used in the maximum concentration for the relevant valuable document or security element. The maximum concentration depends on various parameters, such as the type of incorporation or the desired characteristics of the valuable document or security element.

Figure 3:
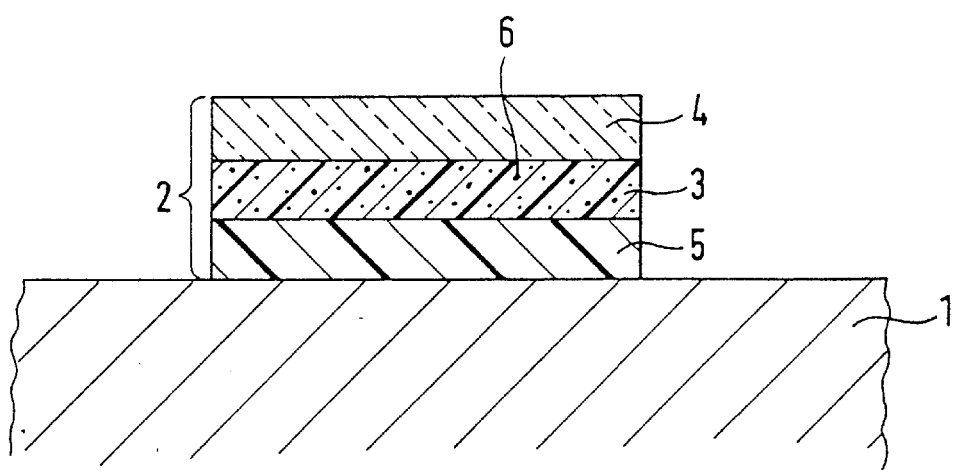

FIG. 3 shows an embodiment of the security element according to the invention. The security element consists in this case of a label 2, which comprises a paper or plastic layer 3, a transparent covering layer 4, and an adhesive layer 5. This label 2 is linked to any desired substrate 1 by means of the adhesive layer 5. This substrate 1 may be a valuable document, identification paper, pass, certificate or other objects to be secured, such as CDs, packaging or similar.

In this example, the luminescent substance 6 is contained within the volume of layer 3. If the layer 3 is a layer of paper, the limit concentration of luminescent substance according to the invention is between 0.05 and 1 percent by weight.

Alternatively, the limit luminescent substance could be contained within a printing ink not shown here, which is printed onto one of the label layers, preferably on the surface of layer 3. The maximum concentration that is just possible according to the invention varies in this case between 10 and 40 percent by weight.

Instead of providing the luminescent substance within or on a substrate material which is then secured as a security element to an object, it is also possible according to the invention to provide the luminescent substance directly within the valuable document to be secured or on its surface in the form of a coating.

[Labels on Individual Curves in FIG. 1]
Si
GaAs
$Ga_{0.7}In_{0.3}As$
Ge
PbS
$Ga_{0.3}In_{0.7}As$
InAs
PbSe

What is claimed is:

1. Printed valuable document with at least one authentication feature in the form of a luminescent substance based on a host lattice doped with at least two rare earth metals, which largely absorbs and is excitable in the visible region of the spectrum and is transparent at least in parts of the IR spectral region, whereby the rare earth metals are thulium and holmium, and the luminescent substance is present in the volume of the valuable document in a concentration of no more than 5 percent by weight.

2. Printed valuable document according to claim 1, wherein the valuable document consists of paper and that the luminescent substance is present in the paper in a concentration of 0.05 to 1 percent by weight.

3. Printed valuable document with at least one authentication feature in the form of a luminescent substance based on a host lattice doped with at least two rare earth metals, which largely absorbs and is excitable in the visible region of the spectrum and is transparent at least in parts of the IR spectral region, whereby the rare earth metals are thulium and holmium, and the luminescent substance is present in a layer applied to the valuable document in a concentration between 1 and 40 percent by weight.

4. Printed valuable document according to claim 3, wherein the luminescent substance is provided as an invisible, at least partial, coating on the valuable document.

5. Printed valuable document according to claim 3, wherein the luminescent substance is mixed into a printing ink, which additionally contains visible colour additions.

6. Printed valuable document according to claim 3, wherein the coating takes the form of one or more stripes.

7. Printed valuable document according to claim 1, wherein the optically transparent region of the host lattice doped with rare earth metals lies in the range between 1 µm and 10 µm.

8. Printed valuable document according to claim 1, wherein the host lattice contains iron or chromium as absorptive elements.

9. Printed valuable document according to claim 1, wherein the host lattice has a garnet or perovskite structure.

10. Printed valuable document according to claim 1, wherein the host lattice has a garnet structure that can be described with the general formula $$A_3M_{5-x}Al_xO_{12}$$

where A stands for an element belonging to the group yttrium, gadolinium, scandium and lanthanum, M stands for iron or chromium and the index x fulfils the condition $0<x<4.99$.

11. Printed valuable document according to claim 10, wherein the index x fulfils the condition $0<x<2$.

12. Printed valuable document according to claim 10, wherein the luminescent substance can be described with the general formula $$Y_{3-z-y}Tm_zHo_yFe_{5-x}Al_xO_{12}$$

where the index z fulfils the condition $0.01<z<2$, and the index y fulfils the condition $0.01<y<2$.

13. Printed valuable document according to claim 1, wherein the host lattice has a perovskite structure that can be described with the general formula $$AMO_3$$

where A stands for an element belonging to the group yttrium, scandium or the lanthanides, M stands for iron or chromium.

14. Printed valuable document according to claim 13, wherein the luminescent substance can be described with the general formula $$Y_{1-z-y}Tm_zHo_yFeO_3$$

where the index z fulfils the condition $0.01<z<0.8$, and the index y fulfils the condition $0.01<y<0.8$.

15. Printed valuable document according to claim 1, wherein the luminescent substance has a quantum yield of 50 to 90%.

16. Security element having at least one substrate material and a luminescent substance based on a host lattice doped with at least two rare earth metals, which largely absorbs and is excitable in the visible region of the spectrum and is transparent at least in parts of the IR spectral region, whereby the rare earth metals are thulium and holmium, and the luminescent substance is present in the volume of the substrate material in a concentration of no more than 6 percent by weight and said substrate material consists of paper.

17. Security element according to claim 16, wherein the substrate material consists of plastic and the luminescent substance is present in the plastic in a concentration of no more than 10 percent by weight.

18. Security element having at least one substrate material and a luminescent substance based on a host lattice doped with at least two rare earth metals, which largely absorbs and is excitable in the visible region of the spectrum and is transparent at least in parts of the IR spectral region, whereby the rare earth metals are thulium and holmium, and the luminescent substance is present in a layer applied to the substrate material in a concentration in the range between 1 and 40 percent by weight; with the proviso that said luminescent substance is present in a printing ink.

19. Security element according to claim 16, wherein the security element takes the form of a stripe or band.

20. Security element according to claim 19, wherein the substrate material takes the form of security threads or mottling fibres.

21. Security element according to claim 16, wherein the security element takes the form of a label.

22. Printed valuable document according to claim 3, wherein the layer applied to the valuable document is a printing ink in which the luminescent substance is present in a concentration between 10 and 30 percent by weight.

23. Printed valuable document according to claim 12, wherein the luminescent substance can be described with the general formula $$Y_{3-z-y}Tm_zHo_yFe_{5-x}Al_xO_{12}$$

where the index z fulfils the condition $0.1<z<1$, and the index y fulfils the condition $0.1<y<1$.

24. Printed valuable document according to claim 14, wherein the luminescent substance can be described with the general formula $$Y_{1-z-y}Tm_zHo_yFeO_3$$

where the index z fulfils the condition $0.1<z<0.5$, and the index y fulfils the condition $0.1<y<0.5$.

25. Security element according to claim 16, wherein the substrate material consists of paper and the luminescent substance is present in the paper in a concentration of no more than from 0.05 to 1 percent by weight.

26. Security element according to claim 18, wherein the luminescent substance is present in a printing ink in a concentration in the range between 10 and 30 percent by weight.

* * * * *